2,979,437

SUBSTITUTED STYRYL, AND THIENYLETHENYL, PYRIDYLETHENYL SULFONYLUREAS AND METHOD OF TREATING DIABETES

William M. McLamore, Kew Gardens, and Gerald D. Laubach, Jackson Heights, N.Y., assignors to Chas. Pfizer & Co., Inc., New York, N.Y., a corporation of Delaware No Drawing. Filed Sept. 2, 1958, Ser. No. 758,559

7 Claims. (Cl. 167—65)

This invention relates to new and useful aralkenesulfonylureas. Moreover, it is particularly concerned with N-aralkenesulfonyl-N'-substituted ureas, such as N-(2-arylethene-1-sulfonyl)-N'-alkyl- or arylureas, and the like. These compounds are of especial value due to the hypoglycemic activity which they exhibit. There is also included within the scope of this invention pharmaceutical compositions comprising these aralkenylsulfonylureas as the essential active ingredient together with diluent amounts of pharmaceutically acceptable inert carriers.

The aralkenesulfonylureas of the present invention are of the general formula $RCH=CHSO_2NHCONHR'$; wherein R is an aryl moiety, such as a phenyl, thienyl or pyridyl radical which is either unsubstituted or substituted with such groups as halogen, lower alkyl and lower alkoxyl, nitro and acetylamino, e.g., p-fluorophenyl, p-chlorophenyl, p-bromophenyl, p-nitrophenyl, p-acetylaminophenyl, p-tolyl, p-anisyl, 2,4-dimethylphenyl, 2,5-dimethylphenyl, 3,4-dichlorophenyl, 3-chloro-p-tolyl, 5-chloro-2-thienyl, 5-bromo-2-thienyl, 5-methyl-2-thienyl, 4-methyl-2-thienyl, 5-t-butyl-2-thienyl, 2,5-dimethyl-3-thienyl, 2,5-dichloro-3-thienyl, 5-chloro-2-methyl-3-thienyl, 6-methyl-2-pyridyl and 4,6-dimethyl-2-pyridyl, 6-amino-3-pyridyl, and the like; and R' is alkyl having from one to ten carbon atoms, alkenyl having from three to eight carbon atoms, cycloalkyl having from three to six carbon atoms and cycloalkylalkyl having from four to nine carbon atoms, or it is an aryl moiety as previously defined for R; preferred R' aryl moieties include phenyl, p-chlorophenyl, p-bromophenyl, p-nitrophenyl, p-acetylaminophenyl, p-tolyl, p-anisyl, 2-thienyl, 2-pyridyl, and the like. Examples of such compounds include N-(β-styrenesulfonyl)-N'-n-butylurea, N-(p-chloro-β-styrenesulfonyl)-N'-p-anisylurea, N-(p-bromo-β-styrenesulfonyl)-N'-cyclohexylurea, N-(p-methyl-β-styrenesulfonyl)-N'-p-chlorophenylurea and N-(2-thienylethene-1-sulfonyl)-N'-n-propylurea.

The advantages afforded by the aralkenesulfonylureas of this invention are manifold: they may be administered orally, thus eliminating the parenteral route which is often painful and irritating; they lower blood sugar levels to an effective degree in animals, including humans, for a sustained period of time; their toxic side effects are either minimal or absent; they present no evidence of kidney damage or crystalluria; and they are readily obtained in good yields from commercially available starting materials by either of two relatively simple methods, as discussed hereinafter.

For instance, regarding methods for preparing the compounds of this invention, an appropriate aralkenesulfonamide can be reacted with the desired organic isocyanate in accordance with a modification of the classical procedure (F. Kurzer, Journal of the Chemical Society, 1951, page 1258) described in detail in some of the examples of this specification; alternatively, these compounds may also be synthesized by reacting a mono-alkali metal salt or an alkaline-earth metal salt of the corresponding aralkenesulfonamide in a reaction inert polar organic solvent with an appropriate N,N-diaryl-N'-substituted urea in accordance with the novel procedure described and claimed in copending U.S. patent application Ser. No. 711,570, filed on January 28, 1958, by the present co-inventors.

The starting materials required for preparing the compounds of this invention are either commercially available or else they are easily prepared in accordance with the method disclosed by F. G. Bordwell et al. in the Journal of the American Chemical Society, vol. 68, p. 139 (1946), whereby an aralkene compound is reacted with dioxane-sulfotrioxide to afford good yields of the corresponding 2-arylethene-1-sulfonic acids. The monoalkali metal, or alkaline-earth metal salts of these sulfonic acids are obtained by the addition of an aqueous solution of the appropriate metallic carbonate or hydroxide to the original sulfonation mixture; the salts which form are easily isolated from the mixture and they can be subsequently converted to the corresponding aralkenesulfonyl chlorides by treatment with phosphorus pentachloride. The parent aralkenes (arylethenes), which are the ultimate starting materials for this particular series of reactions, are for the most part commercially available with the exception of those aralkenes of the thiophene series; the latter compounds may be easily prepared in accordance with the methods discussed by Hartough on page 164 of his authoritative textbook, "Thiophene and its Derivatives," Interscience Publishers, Inc., New York, N.Y. (1952).

The N,N-diaryl-N'-monosubstituted ureas may be readily prepared by means of the following reaction, which is illustrated below, wherein R" is an aryl moiety, such as phenyl, p-chlorophenyl, p-bromophenyl, p-nitrophenyl, p-tolyl, p-anisyl, α-naphthyl and β-naphthyl, in accordance with the procedure described by Reudel in the Recueil des Travaux Chimiques des Pays-Bas, vol. 33, p. 64 (1914):

$$(R'')_2N-COCl + R'NH_2 \rightarrow (R'')_2NCONHR' + HCl$$

The two reactants stated in the above equation are either commercially available or else they can easily be prepared by those skilled in the art from readily available starting materials according to classical organic procedures such as those presented by Houben-Weyl in "Die Methoden der organischen Chemie," Fourth Edition, vol. 8, p. 117 (1952).

The aralkenesulfonylureas of this invention may be administered either alone or in combination with a diluent amount of a pharmaceutically acceptable inert carrier. In general, the usual dosage for administering these compounds to animals is in the range of approximately 0.25–2.5 g. per day in the order of about one to about five doses. However, this will vary somewhat with the weight of the subject being treated; ordinarily, about 4.0–40 mg./kg. of body weight per day is employed. In this connection, it should be noted that the aforementioned requisite dosage is substantially below the $LD_{50}$ value for these compounds.

For purposes of oral administration, these compounds may be administered in the form of hard or soft-filled gelatin capsules containing an inert filler such as lactose or milk sugar; or they may be administered in the form of elixers, syrups or aqueous suspensions, such carriers containing sweetening and/or flavoring agents. The preferred method of oral administration comprises the use of a rapidly disintegrable, palatable tablet. A preferred form of such a tablet comprises a plurality of compressed granules containing a sweetening agent bound therewithin by a sugar alcohol and dispersed in the interstices between said granules, a flavoring agent and a hydrophilic starch adapted to swell rapidly on contact with water, thereby disintegrating said tablet, This invention is further illustrated by the following examples, which are not to be considered as imposing any limitations on the scope thereof.

Example I

A solution consisting of 3.5 g. (0.035 mole) of n-butyl isocyanate dissolved in 10 ml. of anhydrous dimethylformamide was added to a chilled solution consisting of 5.5 g. (0.030 mole) of β-styrenesulfonamide dissolved in 15 ml. of anhydrous triethylamine; the addition was carried out with constant agitation during the course of about fifteen minutes. The mildly exothermic reaction was completed by allowing it to stand at room temperature for about five days. The reaction mixture was then slowly added to 500 ml. of chilled 70% acetic acid during the course of about one-half hour with constant agitation being maintained throughout the addition. After this step was completed, the crystalline material which had precipitated from solution was recovered by means of filtration and subsequently washed with 100 ml. of cold water. The crude material so obtained was then dissolved in 200 ml. of cold 5% sodium carbonate and the resulting solution was immediately filtered in order to remove any insoluble gum. Isolation of the desired product from the resulting filtrate was then effected by slowly adding 500 ml. of 20% acetic acid to the filtrate, whereupon precipitation of the crystalline material occurred. The product was then filtered, washed and subsequently air dried to afford pure N-(β-styrenesulfonyl)-N'-n-butylurea, which melted at 127.3–128° C. after one recrystallization from chloroform-diethyl ether in the presence of charcoal.

Analysis.—Calcd. for $C_{13}H_{18}N_2O_3S$: C, 55.30; H, 6.43; N, 9.92. Found: C, 55.36; H, 6.58; N, 9.78.

Example II

The procedure described in Example I was followed except that 5.5 g. (0.030 mole) of β-styrenesulfonamide dissolved in 15 ml. of anhydrous triethylamine and 3.0 g. (0.035 mole) of n-propyl isocyanate dissolved in 10 ml. of anhydrous dimethylformamide are reacted to afford N-(β-styrene-sulfonyl)-N'-n-propylurea, M.P. 157–175.5° C.

Analysis.—Calcd. for $C_{12}H_{16}N_2O_3S$: C, 53.71; H, 6.01; N, 10.49. Found: C, 52.62; H, 5.83; N, 10.05.

In the same manner, corresponding molar amounts of p-chloro-β-styrene-sulfonamide and p-chlorophenyl isocyanate react to afford N-(p-chloro-β-styrene-sulfonyl)-N'-p-chlorophenyl-urea similarly, p-bromo-β-styrenesulfonamide and cyclohexyl isocyanate react to afford N-(p-bromo-β-styrenesulfonyl)-N'-cyclohexylurea. Moreover, when p-methyl-β-styrenesulfonamide and p-anisyl isocyanate are reacted in accordance with this same procedure, the product obtained is N-(p-methyl-β-styrenesulfonyl)-N'-p-anisylurea.

Example III

The procedure described in Example I is followed by reacting 5.5 g. (0.030 mole) of β-styrenesulfonamide in 15 ml. of triethylamine and 2.0 g. (0.035 mole) of methyl isocyanate in 10 ml. of dimethylformamide to yield N-(β-styrenesulfonyl)-N'-methylurea. In the same manner, corresponding molar amounts of p-fluoro-β-styrenesulfonamide and ethyl isocyanate react to yield N-(p-fluoro-β-styrenesulfonyl)-N'-ethylurea. When p-chloro-β-styrenesulfonamide and n-propyl isocyanate react in accordance with this procedure, the product is N-(p-chloro-β-styrenesulfonyl)-N'-n-propylurea, while p-bromo-β-styrenesulfonamide and n-butyl isocyanate react in the same manner to afford N-(p-bromo-β-styrenesulfonyl)-N'-n-butylurea.

In the same manner, p-nitro-β-styrenesulfonamide and t-butyl isocyanate react to afford N-(p-nitro-β-styrenesulfonyl)-N'-t-butylurea; p-acetylamino-β-styrenesulfonamide and n-amyl isocyanate react to afford N-(p-acetylamino-β-styrenesulfonyl)-N'-n-amylurea; p-methyl-β-styrenesulfonamide and n-hexyl isocyanate react to afford N-(p-methyl-β-styrenesulfonyl)-N'-n-hexylurea; p-methoxy-β-styrenesulfonamide and n-octyl isocyanate react to afford N-(p-methoxy-β-styrenesulfonyl)-N'-n-octylurea; 2,4-dimethyl-β-styrenesulfonamide and n-decyl isocyanate react to afford N-(2,4-dimethyl-β-styrenesulfonyl)-N'-n-decylurea; 2,5-dimethyl-β-styrenesulfonamide and cyclopropyl isocyanate react to afford N-(2,5-dimethyl-β-styrenesulfonyl)-N'-cycyclopropylurea; 3,4-dichloro-β-styrenesulfonamide and cyclobutyl isocyanate react to afford N-(3,4-dichloro-β-styrenesulfonyl)-N'-cyclobutylurea; and 3-chloro-p-methyl-β-styrenesulfonamide and cyclopentyl isocyanate react to afford N-(3-chloro-p-methyl-β-styrenesulfonyl)-N'-cyclopentylurea.

Example IV

When 5.65 g. (0.030 mole) of 2-thienylethene-1-sulfonamide and 3.0 g. (0.035 mole) of n-propyl isocyanate react in accordance with the procedure of Example I, the product is N-(2-thienylethene-1-sulfonyl)-N'n-propylurea; and when corresponding molar amounts of 2-thienylethene-1-sulfonamide and cyclohexyl isocyanate react in accordance with this same procedure, the product is N-(2-thienylethene-1-sulfonyl)-N'-cyclohexylurea. In the same manner, corresponding molar amounts of 5-chloro-2-thienylethene-1-sulfonamide and allyl isocyanate react to afford N-(5-chloro-2-thienylethene-1-sulfonyl)-N'-allylurea; 5-bromo-2-thienylethene-1-sulfonamide and 2-amylene isocyanate react to afford N-(5-bromo-2-thienylethene-1-sulfonyl)-N'-2-amyleneurea; 5-methyl-2-thienylethene-1-sulfonamide and 2-octylene isocyanate react to afford N-(5-methyl-2-thienylethene-1-sulfonyl)-N'-2-octyleneurea; 4-methyl-2-thienylethene-1-sulfonamide and cyclopropylmethyl isocyanate react to afford N-(4-methyl-2-thienylethene-1-sulfonyl)-N'cyclopropylmethylurea; 5-t-butyl-2-thienylethene-1-sulfonamide and cyclopentylethyl isocyanate react to afford N-(5-t-butyl-2-thienylethene-1-sulfonyl)-N'-cyclopentylethylurea; 2-pyridylethene-1-sulfonamide and cyclohexylpropyl isocyanate react to afford N-(2-pyridylethene-1-sulfonyl)-N'-cyclohexylpropylurea; 6-methyl-2-pyridylethene-1-sulfonamide and phenyl isocyanate react to afford N-(6-methyl-2-pyridylethene-1-sulfonyl)-N'-phenylurea; and 4,6-dimethyl-2-pyridylethene-1-sulfonamide and p-chlorophenyl isocyanate react to afford N-(4,6-dimethyl-2-pyridylethene-1-sulfonyl)-N'-p-chlorophenylurea.

Example V

When 5.5 g. (0.030 mole) of β-styrenesulfonamide dissolved in 15 ml. of triethylamine and 6.9 g. (0.035 mole) of p-bromophenyl isocyanate dissolved in 10 ml. of dimethylformamide react in accordance with the procedure of Example I, the product is N-(β-styrenesulfonyl)-N'-p-bromophenylurea. In the same manner, corresponding molar amounts to p-fluoro-β-styrenesulfonamide and p-nitrophenyl isocyanate react to afford N-(p-fluoro-β-styrenesulfonyl)-N'-p-nitrophenylurea; p-chloro-β-styrenesulfonamide and p-acetylaminophenyl isocyanate react to afford N-(p-chloro-β-styrenesulfonyl)-N'-p-acetylaminophenylurea; p-bromo-β-styrenesulfonamide and p-tolyl isocyanate react to afford N-(p-bromo-β-styrenesulfonyl)-N'-p-tolylurea; p-nitro-β-styrenesulfonamide and p-anisyl isocyanate react to afford N-(p-nitro-β-styrenesulfonyl)-N'-p-anisylurea; p-acetylamino-β-styrenesulfonamide and 2-thienyl isocyanate react to afford N-(p-acetylamino-β-styrenesulfonyl)-N'2-thienylurea; and p-methyl-β-styrenesulfonamide and 2-pyridyl isocyanate react to afford N-(p-methyl-β-styrenesulfonyl)-N'-2-pyridylurea.

Example VI

A solution of 5.4 g. (0.030 mole) of the monosodium salt of β-styrenesulfonamide and 10.7 g. (0.040 mole) of N,N-diphenyl-N'-n-butylurea in 25 ml. of anhydrous dimethylformamide was heated on a steam bath for about five hours. The reaction mixture was then cooled to room temperature and diluted with 20 ml. of water. After the resulting aqueous solution had been made strongly alkaline with 10% sodium hydroxide, it was extracted with diethyl ether in order to remove the diphenylamine by-product. The resulting aqueous layer was then successively separated and filtered, and the resulting filtrate was slowly poured into a chilled aqueous solution containing excess hydrochloric acid. The precipitated material so obtained was isolated by means of filtration, washed with cold water and subsequently air dried until constant weight was attained. This product proved to be N-(β-styrenesulfonyl)-N'-n-butylurea, as attested to by its melting point and by the fact that no depression in the latter could be observed when it was admixed with an authentic sample prepared in accordance with Example I.

In the same manner, 3.2 g. (0.015 mole) of the monosodium salt of p-chloro-β-styrenesulfonamide and 6.35 g. (0.025 mole) of N,N-diphenyl-N'-n-propylurea are reacted in 10 ml. of anhydrous dimethylformamide to afford N-(p-chloro-β-styrenesulfonyl)-N'-n-propylurea.

Example VII

The procedure described in Example VI is followed except that corresponding molar amounts of other N,N-diphenyl-N'-substituted ureas are used in place of N,N-diphenyl-N'-n-butylurea or N,N-diphenyl-N'-n-propylurea. Thus, when 3.2 g. (0.015 mole) of the monosodium salt of p-chloro-β-styrenesulfonamide and 6.0 g. (0.025 mole) of N,N-diphenyl-N'-ethylurea in 10 ml. of anhydrous dimethylformamide react, the product is N-(p-chloro-β-styrenesulfonyl)-N'-ethylurea. In the same manner, corresponding molar amounts of the monosodium salt of p-fluoro-β-styrenesulfonamide and N,N-diphenyl-N'-methylurea react to yield N-(p-fluoro-β-styrenesulfonyl)-N'-methylurea. When the monosodium salt of p-bromo-β-styrenesulfonamide and N,N-diphenyl-N'-phenylurea react, the product is N-(p-bromo-β-styrenesulfonyl)-N'-phenylurea; when N,N-diphenyl-N'-p-chlorophenylurea is used in place of N,N-diphenyl-N'-phenylurea in this same reaction, the product is N-(p-bromo-β-styrenesulfonyl)-N'-p-chlorophenylurea. In the same manner, the monosodium salt of p-nitro-β-styrenesulfonamide and N,N-phenyl-N'-p-tolylurea react to afford N-(p-nitro-β-styrenesulfonyl)-N'-p-tolylurea; and the monosodium salt of p-chloro-β-styrenesulfonamide and N,N-diphenyl-N'-p-anisylurea react to afford N-(p-chloro-β-styrenesulfonyl)-N'-p-anisylurea.

Example VIII

The procedure described in Example VI is followed by reacting 5.85 g. (0.030 mole) of the monosodium salt of p-methyl-β-styrenesulfonamide and 10.15 g. (0.040 mole) of N,N-diphenyl-N'-n-propylurea in 25 ml. of anhydrous dimethylformamide to yield N-(p-methyl-β-styrenesulfonyl)-N'-n-propylurea. In the same manner, corresponding molar amounts of the monosodium salt of p-methoxy-β-styrenesulfonamide and N,N-diphenyl-N'-t-butylurea react to afford N-(p-methoxy-β-styrenesulfonyl)-N'-t-butylurea; the monosodium salt of 2,4-dimethyl-β-styrenesulfonamide and N,N-diphenyl-N'-cyclohexylurea react to afford N-(2,4-dimethyl-β-styrenesulfonyl)-N'-cyclohexylurea; and the monosodium salt of 2,5-dimethyl-β-styrenesulfonamide and N,N-diphenyl-N'-cyclobutylurea react to afford N-(2,5-dimethyl-β-styrenesulfonyl)-N'-cyclobutylurea. When corresponding molar amounts of the monosodium salt of 3,4-dichloro-β-styrenesulfonamide and N,N-diphenyl-N'-allylurea are reacted in accordance with the procedure described in Example VI, the product is N-(3,4-dichloro-β-styrenesulfonyl)-N'-allylurea; in the same manner, the monosodium salt of 3-chloro-p-methyl-β-styrenesulfonamide and N,N-diphenyl-N'-2-amyleneurea react to afford N-(3-chloro-p-methyl-β-styrenesulfonyl)-N'-2-amyleneurea.

Example IX

The procedure of Example VI is followed by reacting 5.65 g. (0.030 mole) of the monosodium salt of 2-thienylethene-1-sulfonamide and 10.15 g. (0.040 mole) of N,N-diphenyl-N'-cyclopropylurea in 25 ml. of anhydrous dimethylformamide to afford N-(2-thienylethene-1-sulfonyl)-N'-cyclopropylurea. In the same manner, corresponding molar amounts of the monosodium salt of 5-chloro-2-thienylethene-1-sulfonamide and N,N-diphenyl-N'-cyclopropylmethylurea react to afford N-(5-chloro-2-thienylethene-1-sulfonyl)-N'-cyclopropylmethylurea; the monosodium salt of 5-bromo-2-thienylethene-1-sulfonamide and N,N-diphenyl-N'-cyclopentylethylurea react to afford N-(5-bromo-2-thienylethene-1-sulfonyl)-N'-cyclopentylethylurea; the monosodium salt of 5-methyl-2-thienylethene-1-sulfonamide and N,N-diphenyl-N'-cyclohexylpropylurea react to afford N-(5-methyl-2-thienylethene-1-sulfonyl)-N'-cyclohexylpropylurea; and the monosodium salt of 4-methyl-2-thienylethene-1-sulfonamide and N,N-diphenyl-N'-cyclobutylurea react to afford N-(4-methyl-2-thienylethene-1-sulfonyl)-N'-cyclobutylurea; when the monosodium salt of 5-t-butyl-2-thienylethene-1-sulfonamide is employed in place of the corresponding salt of 4-methyl-2-thienylethene-1-sulfonamide in this same reaction, the product is N-(5-t-butyl-2-thienylethene-1-sulfonyl)-N'-cyclobutylurea.

Example X

When 4.3 g. (0.015 mole) of the monosodium salt of 2,5-dichloro-3-thienylethene-1-sulfonamide and 7.75 g. (0.025 mole) of N,N-diphenyl-N'-n-heptylurea in 10 ml. of anhydrous dimethylformamide react in accordance with the procedure described in Example VI, the product is N-(2,5-dichloro-3-thienylethene-1-sulfonyl)-N'-n-heptylurea. In the same manner, the monosodium salt of 2,5-dimethyl-3-thienylethene-1-sulfonamide and N,N-diphenyl-N'-p-bromophenylurea react to afford N-(2,5-dimethyl-3-thienylethene-1-sulfonyl)-N'-p-bromophenylurea; the monosodium salt of 5-chloro-2-methyl-3-thienyl-ethene-1-sulfonamide and N,N-diphenyl-N'-n-decylurea react to afford N-(5-chloro-2-methyl-3-thienylethene-1-sulfonyl)-N'-n-decylurea; the monosodium salt of 2-pyridylethene-1-sulfonamide and N,N-diphenyl-N'-p-anisylurea react to afford N-(2-pyridylethene-1-sulfonyl)-N'-p-anisylurea; the monosodium salt of 6-methyl-2-pyridylethene-1-sulfonamide and N,N-diphenyl-N'-n-hexylurea react to afford N-(6-methyl-2-pyridylethene-1-sulfonyl)-N'-n-hexylurea and the monosodium salt of 4,6-dimethyl-2-pyridylethene-1-sulfonamide and N,N-diphenyl-N'-n-octylurea react to afford N-(4,6-dimethyl-2-pyridylethene-1-sulfonyl)-N'-n-octylurea.

Example XI

Tablets containing N-(β-styrenesulfonyl)-N'-n-butylurea as the essential active ingredient together with a diluent amount of a pharmaceutically acceptable inert carrier are administered to each of a group of test subjects; an average dose of one to five tablets per day is administered orally, each tablet containing at least 500 mg. of active ingredient. The tablets employed are molded by compression in tablet machines. The diluent amount of a pharmaceutically acceptable, inert carrier consists of a sweetening agent, such as saccharin, bound therewithin by a sugar alcohol, such as lactose; it is moistened with alcohol and then forced through screens to form granules. There is then dispersed in the interstices between said granules a flavoring agent and a hydrophilic starch adapted to swell rapidly on contact with water, thereby disintegrating said tablet. The mixture is then completely dried before the tablets are punched. It is found that a very good control of high blood sugar levels is obtained after oral administration of such N-(β-styrenesulfonyl)-N'-n-butylurea containing tablets; the compound is rapidly absorbed when given by mouth, with maximum blood levels of the compound occurring within two to four hours. In one to three hours following an oral dose, the blood sugar level is observed to decrease in the majority of these cases.

*Example XII*

The same procedure as described in Example XI is followed except that gelatin capsules are used in place of tablets. The capsules employed are either of the hard filled or soft elastic type. In the hard filled type, one part of the capsule is filled with at least 500 mg. of N-(β-styrenesulfonyl)-N'-n-propylurea together with a diluent amount of an inert filler, such as lactose; the cap is then replaced and the capsule is ready for use. In the case of the soft elastic capsules, the same ingredients are deposited between layers of gelatin so prepared that when they are forced together under pressure they seal to afford an oval or spherical shaped capsule. In both cases, the results obtained with respect to hypoglycemic activity are similar to those obtained with the tablet.

What is claimed is:

1. An aralkenesulfonylurea of the formula

RCH=CHSO₂NHCONHR' wherein R is an aryl moiety selected from the group consisting of phenyl, thienyl, pyridyl, substituted phenyl, substituted thienyl and substituted pyridyl, each substituent of such substituted moieties being selected from the group consisting of halogen, lower alkyl and lower alkoxy, nitro and acetylamino; and R' is a member of the group consisting of alkyl having from one to ten carbon atoms, alkenyl having from three to eight carbon atoms, cycloalkyl having from three to six carbon atoms, cycloalkylalkyl having from four to nine carbon atoms, phenyl, p-chlorophenyl, p-bromophenyl, p-nitrophenyl, p-acetylaminophenyl, p-tolyl, p-anisyl, 2-thienyl and 2-pyridyl.

2. The method of orally treating diabetes, which method comprises orally administering a compound of claim 1 to a diabetic patient, the daily dose amount administered being from about 4.0–40 mg./kg. of body weight of said patient.

3. N-(β-styrylsulfonyl)-N'-n-butylurea.
4. N-(p-chloro-β-styrylsulfonyl)-N'-chlorophenylurea.
5. N-(p-bromo-β-styrylsulfonyl)-N'-cyclohexylurea.
6. N-(p-methyl-β-styrylsulfonyl)-N'-p-anisylurea.
7. N-(2-thienylethenyl-1-sulfonyl)-N'-n-propylurea.

References Cited in the file of this patent

FOREIGN PATENTS

| | | |
|---|---|---|
| 70,259 | Denmark | Dec. 28, 1949 |
| 71,236 | Norway | Nov. 4, 1946 |
| 919,464 | France | Nov. 25, 1946 |
| 120,428 | Sweden | Dec. 16, 1947 |